April 30, 1957 N. J. KODA ET AL 2,790,228

PROCESS FOR PRODUCING A STORAGE GRID ASSEMBLY

Filed July 7, 1955 2 Sheets-Sheet 1

INVENTORS.
NOBUO J. KODA,
KAY M. HOALST,
BY
Henry Heyman
ATTORNEY.

INVENTORS.
NOBUO J. KODA,
KAY M. HOALST,
BY
Henry Heyman
ATTORNEY.

United States Patent Office 2,790,228

Patented Apr. 30, 1957

2,790,228

PROCESS FOR PRODUCING A STORAGE GRID ASSEMBLY

Nobuo J. Koda, Culver City, and Kay Marshall Hoalst, Manhattan Beach, Calif., assignors to Hughes Aircraft Company, Culver City, Calif., a corporation of Delaware Application July 7, 1955, Serial No. 520,446

2 Claims. (Cl. 29—25.17)

This invention relates to a process for producing a storage grid assembly for use in a direct-viewing storage device and more particularly to a process for producing a storage grid assembly having uniform characteristics over its entire surface.

The process of the present invention is directed towards but not limited to the fabrication of a storage grid assembly for use in the direct-viewing half-tone storage device disclosed in a copending application for patent Serial No. 459,403 entitled, "Direct-Viewing Half-Tone Storage Device" filed by G. F. Smith and E. E. Herman on September 30, 1954. In the Smith et al. application, a direct-viewing halftone storage device is disclosed which incorporates a storage grid assembly comprising an electroformed nickel screen having patches of dielectric material of uinform thickness distributed uniformly over approximately 50% of the exposed surface on one side of the meshes thereof. Considerable difficulty has been experienced in making a storage grid assembly of this type. This difficulty resided principally in the maintaining of a mash sufficiently close to the entire exposed surface of the electroformed nickel mesh so that the dielectric material when evaporated thereon will be deposited in exact conformance with the shape of the interstices in the mask. One of the reasons for this is believed to be due to the numerous small "wrinkles" found to exist on commercially available electroformed nickel screen. In addition, another difficulty resided in keeping the meshes of the mask and target in intimate contact over every portion of the screen when both the mask and target screens were heated to the temperature necessary for evaporation of the dielectric material.

In accordance with the process of the present invention, a mask of a malleable metal having a thickness many times that of the proposed thickness of the patches of dielectric material is employed. This mask is pressed onto an electroformed nickel screen under several hundred tons of pressure by means of a cushioned surface so as to not deform the initial shape of its meshes except to the extent that the mask is pressed into the interstices of the nickel screen as well as into intimate contact with the meshes thereof. A dielectric material suitable for providing a storage surface is then evaporated onto the nickel screen through the mask. The mask is then peeled off, leaving patches of dielectric material uniformly distributed over the meshes of the electroformed nickel screen.

It is therefore an object of the invention to provide a process for fabricating a storage grid assembly adaptable for use in a direct-viewing storage device.

Another object of the invention is to provide a process for fabricating a storage grid assembly that has uniform characteristics over its entire area.

Still another object of the invention is to provide a process for fabricating a storage grid assembly of improved quality and characteristics over those presently available.

A further object of the invention is to provide a process for fabricating a storage grid assembly that is readily adaptable to mass production techniques.

The novel features which are believed to be characteristic of the invention, both as to its organization and method of operation, together with further objects and advantages thereof, will be better understood from the following description considered in connection with the accompanying drawings in which an embodiment of the invention is illustrated by way of example. It is to be expressly understood, however, that the drawings are for the purpose of illustration and description only, and are not intended as a definition of the limits of the invention.

Figure 1:
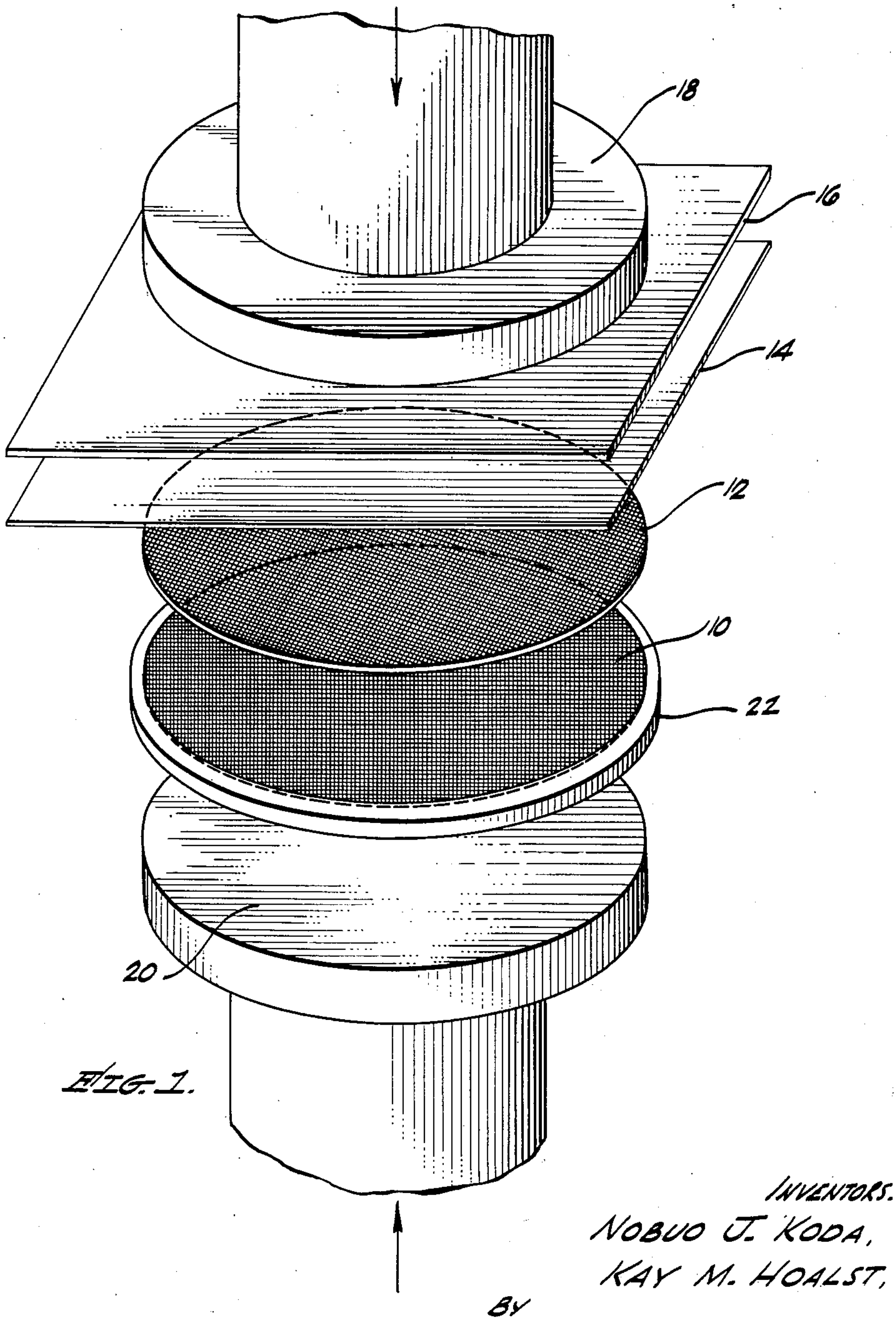
Fig. 1 is an exploded view illustrating the manner in which the mask is pressed onto the electroformed nickel screen.

Referring now to Fig. 1 there is illustrated an arrangement in which a target screen 10, a malleable metal mask 12, a thin sheet 14 of dielectric material such as, for example, "Teflon," and a comparatively thick rubber sheet 16, are pressed together by means of a pair of steel blocks 18, 20. In general, when the screen 10 and mask 12 have substantially the same number of meshes per unit length, the meshes are disposed at an angle of 45° in order to minimize the "moire" effect on the flood electrons.

More particularly, the target screen 10 consists of an electroformed metal screen such as, for example, of nickel. The screen 10 may have of the order of 250 meshes per inch, is 0.0006 inch thick, and has a light transparency of the order of 36%. The malleable foraminous metal mask 12, on the other hand, is composed of a malleable metal such as, for example, copper. The copper mask 12 may have dimensions comparable to those of the nickel screen 10, i. e., 250 meshes per inch, a 35% light transparency, and a thickness of 0.0006 inch.

The characteristics of the thin sheet 14 are that it have a comparatively low coefficient of friction and a relatively high elasticity as it is necessary that there be relative movement between its surface and that of the copper mask 12 in the regions where the mask 12 is forced into the interstices of the nickel screen 10. A sheet of "Teflon" having a thickness of the order of 0.005 inch has been found to have suitable characteristics so as to be satisfactory for this purpose.

The rubber sheet 16, which provides the cushioning, preferably has a thickness of the order of 0.015 inch. The purpose of the sheets 14, 16 is to act as a cushion so that when the target screen 10 and mask 12 are pressed together by the steel blocks 18, 20, the malleable metal constituting the mask 12 is pressed into the interstices of the nickel target screen 10 without being flattened. In pressing the malleable metal mask 12 into the interstices of the nickel target screen 10, it has been found desirable to first stretch the target screen 10 by means of a jig 22. Also, the surfaces of the blocks 18, 20 which are to be in contact with the rubber sheet 16 and the target screen 10 are made accurately flat so as to exert a uniform pressure over each elemental area of the screen. The "sandwich" consisting of the target screen 10 covered with the malleable metal mask 12 and the teflon and rubber sheets 14, 16 is then inserted between the blocks 18, 20 which are, in turn, pressed together under a force of the order of 200 tons over a five-inch diameter surface, or about 10 tons per square inch.

Figure 2:
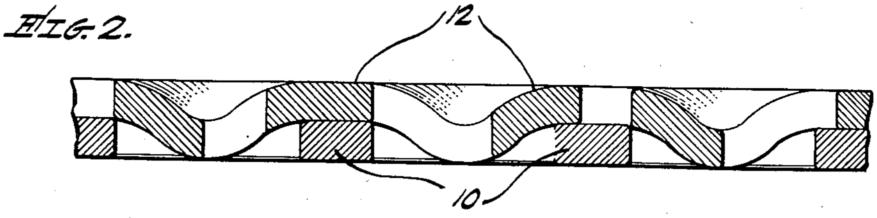
Figs. 2–4 are enlarged cross-sectional views illustrating successive steps of the process of the present invention.

This pressure causes the rubber sheet 16 and the teflon sheet 14 to force the meshes of the mask 12 into the interstices of the target screen 10 in the manner shown in cross section in Fig. 2. It is noted that the copper of the mask 12 still retains its mesh shape without becoming flattened due to the cushioning effect of the rubber sheet 16. In this respect, it is evident that the use of equivalent materials for the teflon sheet 14 and rubber sheet 16 which accomplish the same function is within the scope of the teachings of this specification. Further, it is apparent that a single sheet having the combined characteristics of both the teflon sheet 14 and the rubber sheet 16 may be used without departing from the spirit and scope of the invention.

Figure 3:
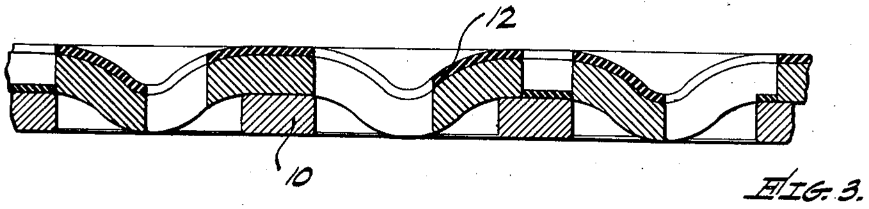
Figure 4:
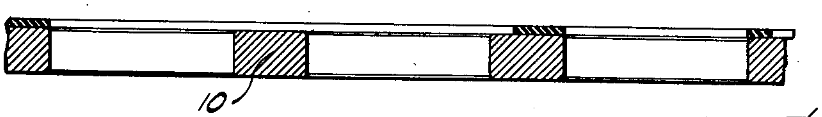
Figure 5:
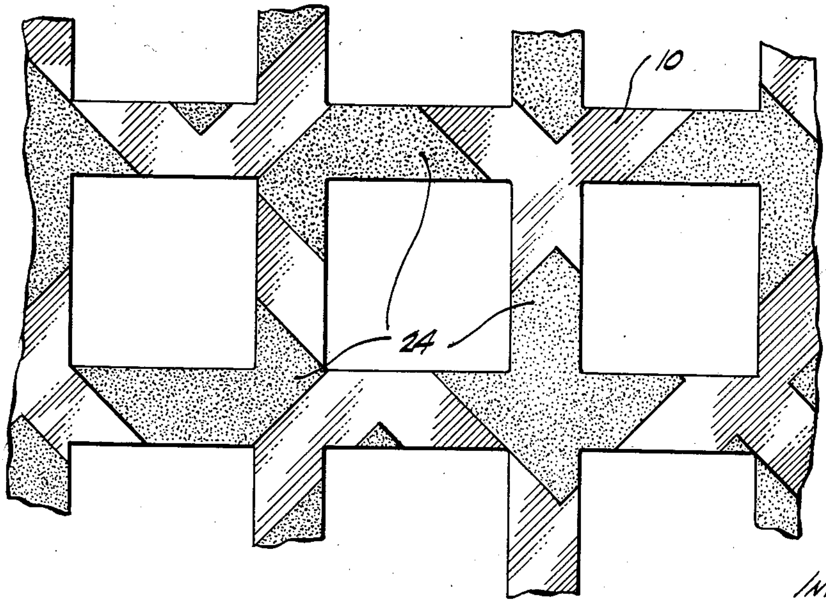
Fig. 5 is a plan view of an enlarged portion of the finished storage grid assembly.

After the meshes of the malleable metal mask 12 have been pressed into the interstices of the target screen 10, the screen 10 with the mask 12 is placed in a vacuum evaporator, and a dielectric material suitable for providing a storage surface such as, for example, magnesium fluoride, is evaporated through the mask onto the meshes of the target screen 10. In the event that magnesium fluoride is used, the screen 10 should be maintained at a temperature of the order of 300° C. to prevent the dielectric from "crazing." Also, the thickness of the layer of dielectric material evaporated on the screen 10 should be substantially less than the thickness of the mask 12 to avoid the formation of any bonds between dielectric material deposited on the mask 12 and on the screen 10. The mask 12 is then peeled off, leaving the desired islands 24 of insulator on the nickel target screen 10 disposed in a uniform array. Figs. 3 and 4 show cross-sectional views of the screen 10 before and after the mask 12 is peeled off, respectively. Fig. 5 is a plan view of an enlarged portion of the target screen 10 showing the islands or patches 24 of dielectric material. The patches 24 of insulator are preferably of uniform thickness and need only be from 2 to 10 microns thick.

What is claimed is:

1. The process of fabricating a storage grid assembly for use in a direct-viewing storage tube, said assembly comprising an electroformed nickel screen, and numerous patches of dielectric material distributed uniformly over one side of the meshes of said screen, said process including the steps of disposing a foraminous copper mask over one entire side of said nickel screen, said mask having a thickness comparable to that of said screen, disposing a thin sheet of teflon over said mask, disposing a comparatively thick sheet of rubber over said sheet of teflon, subjecting said screen covered by said mask and said sheets of teflon and rubber to a uniform pressure of substantially 20 tons per square inch, thereby to press said copper mask into the interstices of said screen substantially without flattening the meshes of said mask, heating said screen to a temperature of from 250° to 350° C., evaporating magnesium fluoride through said mask onto the meshes of said screen while maintaining it at said temperature, and peeling said mask away from said nickel screen, thereby leaving an array of magnesium fluoride patches disposed over one side of the meshes of said electroformed nickel screen.

2. A process of fabricating a storage grid assembly for use in a direct-viewing storage tube, said assembly comprising an electroformed target screen, and numerous patches of dielectric material distributed uniformly over one side of the meshes of said screen, said process including the steps of disposing a malleable foraminous metal mask over one entire side of said screen, disposing a sheet of cushioning material over said mask, subjecting said target screen, said malleable metal mask and said sheet of cushioning material to a uniform pressure, thereby to press said metal mask into the interstices of said screen substantially without flattening the meshes thereof, evaporating a dielectric material through said mask onto the meshes of said electroformed target screen, and peeling said mask away from said target screen, thereby leaving a uniform array of patches constituted of said dielectric material distributed over the meshes of said screen.

References Cited in the file of this patent

UNITED STATES PATENTS 2,115,855 Holman ---------------- May 3, 1938